(12) United States Patent
Grubisic et al.

(10) Patent No.: US 12,545,406 B2
(45) Date of Patent: Feb. 10, 2026

(54) UNMANNED AERIAL VEHICLE

(71) Applicant: HYBRID DRONES LIMITED, London (GB)

(72) Inventors: Angelo Grubisic, London (GB); Stephen Prior, London (GB)

(73) Assignee: Hybrid Drones Limited, London (GB)

( * ) Notice: Subject to any disclaimer, the term of this patent is extended or adjusted under 35 U.S.C. 154(b) by 116 days.

(21) Appl. No.: 17/782,777

(22) PCT Filed: Dec. 6, 2019

(86) PCT No.: PCT/GB2019/053451
§ 371 (c)(1),
(2) Date: Jun. 6, 2022

(87) PCT Pub. No.: WO2021/111097
PCT Pub. Date: Jun. 10, 2021

(65) Prior Publication Data
US 2023/0011791 A1    Jan. 12, 2023

(51) Int. Cl.
*B64D 1/22*    (2006.01)
*B64C 39/02*    (2023.01)
(Continued)

(52) U.S. Cl.
CPC .............. *B64D 1/22* (2013.01); *B64C 39/024* (2013.01); *B64U 10/13* (2023.01); *B64U 50/12* (2023.01);
(Continued)

(58) Field of Classification Search
CPC ........ B64U 10/13; B64U 50/12; B64U 50/13; B64D 1/22; B64C 29/0083; B64C 29/02
See application file for complete search history.

(56) References Cited

U.S. PATENT DOCUMENTS 3,888,435 A * 6/1975 Foote .................. B64C 29/0075
244/58
9,828,094 B2 * 11/2017 McMillion ............. B64U 50/38
(Continued)

FOREIGN PATENT DOCUMENTS

CN        106586001 A      4/2017
CN        107458595 A     12/2017
(Continued)

OTHER PUBLICATIONS

International Search Report and Written Opinion for corresponding Application No. PCT/GB2019/053451 dated Aug. 11, 2020, 12 pages.
(Continued)

*Primary Examiner* — Michael H Wang
*Assistant Examiner* — Colin Zohoori
(74) *Attorney, Agent, or Firm* — Morgan, Lewis & Bockius LLP

(57) ABSTRACT

The present invention provides an unmanned aerial vehicle (100) comprising: a flight system (4) for producing thrust to manoeuvre the unmanned aerial vehicle (100). The flight system (4) comprises: one or more flight rotors (42) defining a plane passing through each flight rotor and a thrust direction generally perpendicular to the plane; and one or more electric motor (44) for driving the one or more flight rotors (42). The unmanned aerial vehicle (100) further comprises: a cargo area for coupling to or receiving a load (200); and a load system (6) for providing thrust additional to the thrust provided by the flight system (4) to thereby lift a load attached to the connection point. The load system (6) comprises: a first gas turbine propulsion system; and a controller configured to control the flight system (4) and load system (6).

8 Claims, 5 Drawing Sheets

(51) Int. Cl.
  *B64U 10/13* (2023.01)
  *B64U 50/12* (2023.01)
  *B64U 50/19* (2023.01)
  *B64U 101/60* (2023.01)

(52) U.S. Cl.
  CPC .......... *B64U 50/19* (2023.01); *B64U 2101/60* (2023.01); *B64U 2201/10* (2023.01)

(56) References Cited

U.S. PATENT DOCUMENTS

| | | | |
|---|---|---|---|
| 10,071,804 | B1 | 9/2018 | Buchmueller et al. |
| 10,625,853 | B2 * | 4/2020 | Mccullough ............ B64C 29/02 |
| 10,676,193 | B2 * | 6/2020 | Lesperance ........... B64C 39/024 |
| 10,717,523 | B2 * | 7/2020 | Sakuma .................. B64C 29/02 |
| 11,485,488 | B1 * | 11/2022 | Armer ................. B64C 29/0033 |
| 11,851,178 | B2 * | 12/2023 | Beck ...................... B64D 27/08 |
| 2007/0057113 | A1 | 3/2007 | Parks |
| 2012/0280091 | A1 * | 11/2012 | Saiz ......................... B64C 27/30 244/6 |
| 2013/0251525 | A1 | 9/2013 | Saiz |
| 2018/0029703 | A1 | 2/2018 | Simon |
| 2018/0099748 | A1 * | 4/2018 | Lesperance .............. B64D 1/02 |
| 2018/0312247 | A1 | 11/2018 | Ichihara |
| 2018/0362169 | A1 * | 12/2018 | Du ......................... B64D 27/06 |
| 2019/0031336 | A1 * | 1/2019 | Mccullough ............ B64C 27/28 |
| 2019/0263519 | A1 * | 8/2019 | Argus ..................... B64C 27/08 |
| 2019/0276140 | A1 * | 9/2019 | Poltorak ............... B60W 20/10 |
| 2020/0031458 | A1 * | 1/2020 | Strauss ................. B64C 39/024 |
| 2023/0038458 | A1 * | 2/2023 | Ryan ..................... B64D 27/24 |

FOREIGN PATENT DOCUMENTS

| | | |
|---|---|---|
| EP | 2881324 A1 | 6/2015 |
| GB | 2578083 B | 4/2020 |
| KR | 20170018671 A | 2/2017 |

OTHER PUBLICATIONS

Combined Search and Examination Report for corresponding Application No. GB1809309.6 dated Jul. 2, 2019, 5 pages.
Extended European Search Report for corresponding European Patent Application No. 24 19 3323 dated Oct. 11, 2024, 8 pages.

* cited by examiner

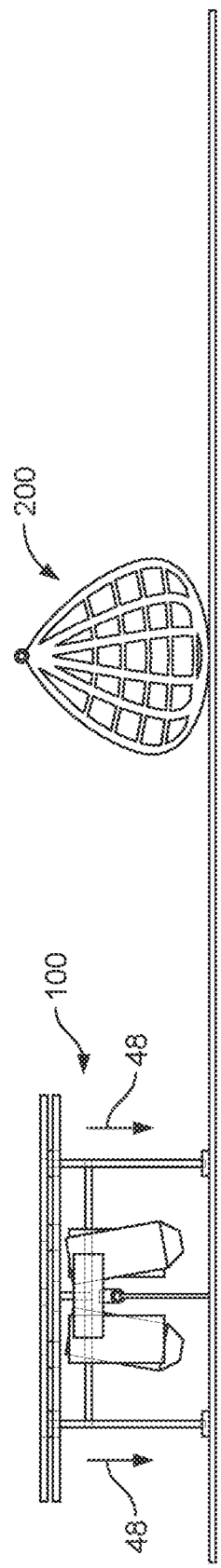
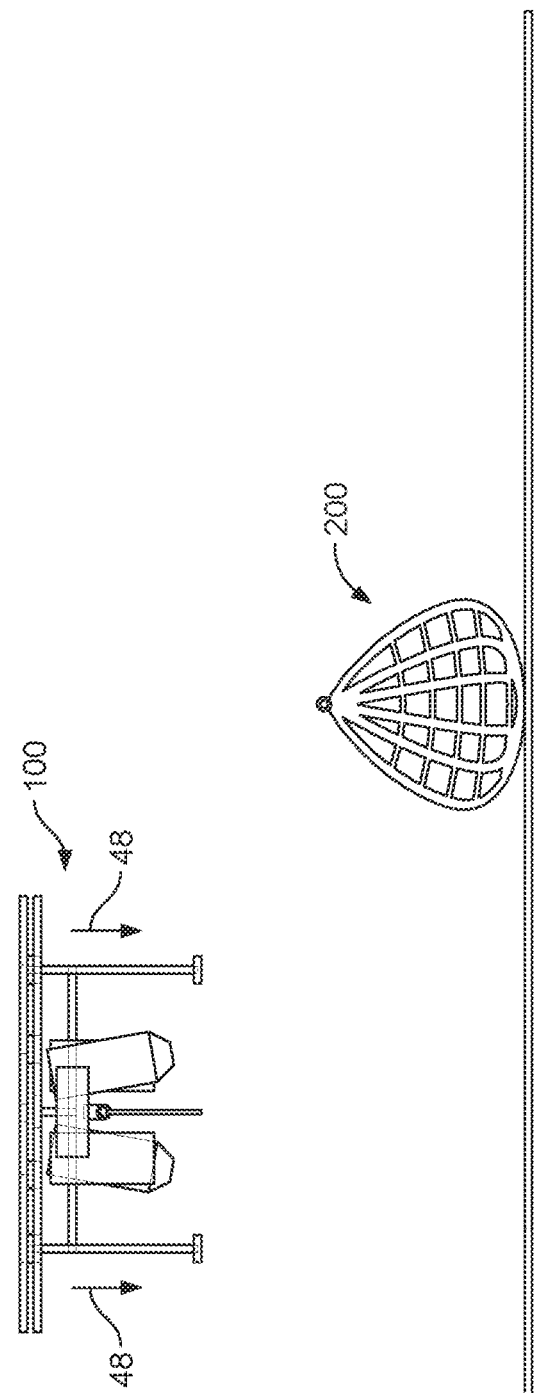
FIG. 3A
FIG. 3B

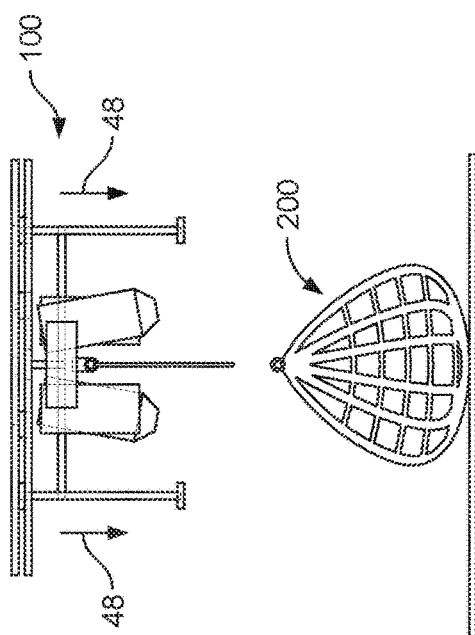
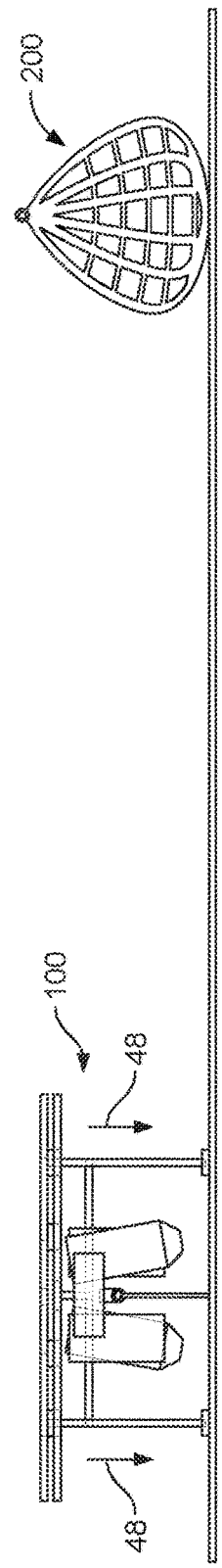
FIG. 3E
FIG. 3F

UNMANNED AERIAL VEHICLE

CROSS REFERENCE TO RELATED APPLICATIONS

This application is a U.S. National Stage Application of International Application No. PCT/GB2019/053451 filed on Dec. 6, 2019, which is incorporated by reference herein in its entirety.

The present invention relates to an unmanned aerial vehicle which is designed to lift and carry heavy loads. In particular, loads of up to and exceeding 100 kg are anticipated. The vehicle may be able to carry such loads distances up to 10 km.

Unmanned aerial vehicles are generally well known, and include drones, rotorcopters, quadcopters, octocopters and the like. Such vehicles are typically provided with an electric motor which drives one or more rotors. The electric motor allows good mobility and manoeuvrability. However, it is difficult to generate a large lift thrust with these conventional vehicles.

In particular, as the payload ratio grows there is a diminishing return in practical range as the required source of electrical power must vastly increase in size. Typically lithium ion batteries are used as a source of electrical power for the electric motors. Such lithium ion batteries can store energy at approximately 2.5 MJ/kg. Therefore, the electrically driven rotors result in a relatively poor endurance and flight range for loads above a minimal weight.

This limitation is not an issue for many applications where there is little or no load to be lifted.

Given the ease of use of drones in remote locations and inaccessible terrain there is a need for drones which are able to assist in heavy lifting. Such assistance may be useful in construction, military deployment or extraction and operations, rescue operations, commercial delivery, or the like.

There is therefore a need for an improved drone which can assist with heavy lifting.

An unmanned aerial vehicle according to a first embodiment of the present invention is provided according to claim 1. The unmanned aerial vehicle comprises: a flight system for providing thrust to manoeuvre the unmanned aerial vehicle comprising: one or more flight rotors defining a thrust direction and a plane generally perpendicular to the thrust direction; and one or more electric motors for driving the one or more flight rotors. The unmanned aerial vehicle further comprises a cargo area for coupling to or receiving a load; and a load system for providing thrust additional to the thrust provided by the flight system to thereby lift a load attached to the connection point comprising: a first gas turbine propulsion system. The unmanned aerial vehicle further comprises a controller configured to control the flight system and load system.

This unmanned aerial vehicle allows the electric flight rotors to be used for the high precision manoeuvrability required for general flight while the gas turbine propulsion system is used to provide lift for lifting a heavy load. This therefore allows the unmanned aerial vehicle to lift a heavy load while maintaining manoeuvrability during flight.

The load system may comprise a plurality of gas turbine propulsion systems. A plurality of gas turbine propulsion systems can increase the amount of thrust available to lift the load.

The gas turbine propulsion systems may be arranged with N-fold rotational symmetry in the plane of the flight rotors around a centre of the unmanned aerial vehicle, wherein N is the number of gas turbine propulsion systems.

The rotational symmetry of the gas turbine propulsion systems allows these systems to balance one another and provide a force simply to aid in the lifting of the load which not affecting the flight of the unmanned aerial vehicle.

Each gas propulsion system may be provided at an angle with respect to the thrust direction of the flight rotors. The angle directs the gas propulsion systems to counteract the load and not affect the flight of the vehicle. Additionally, the jet plume does not impinge upon any load being carried.

Each gas turbine propulsion system may comprise a ducted fan for producing the additional thrust in the form of its exhaust gas jet. Thrust in the form of exhaust gas jet is a thrust to weight efficient manner of generating additional lift.

The gas turbine propulsion system may comprise a turbojet; turbofan; or turboprop. These gas turbine propulsion systems are good methods to generate additional lift for a relatively low weight.

The flight system may comprise two or more rotors, arranged at an outer periphery of the unmanned aerial vehicle, preferably the flight system comprises four or eight rotors. Having the rotors arranged around the periphery of the unmanned aerial vehicle allows for enhanced manoeuvrability of the vehicle.

Each gas turbine propulsion system may be provided within a radius defined by the rotors. As the gas turbine propulsion systems is provided within the radius defined by the rotors the force it generates can be more easily balanced.

An unmanned aerial vehicle according to a second embodiment of the present invention is provided herein. The unmanned aerial vehicle comprises: a flight system for providing thrust to manoeuvre the unmanned aerial vehicle; a cargo area for coupling to or receiving a load; a load system for providing thrust additional to the thrust provided by the flight system to thereby lift a load attached to the connection point; a controller comprising: a first control system configured to control the flight system; and a second control system configured to control the load system, wherein the first and second control systems are independent of one another.

This unmanned aerial vehicle allows the flight system to be used for the high precision manoeuvrability required for flight while the load system is used to provide lift for lifting a heavy load. This therefore allows the unmanned aerial vehicle to lift a heavy load while maintaining manoeuvrability during flight. Separating the first and second control systems allows the controller to effectively and efficiently provide additional thrust when necessary to lift the device separate to the flight control system.

The unmanned aerial vehicle may further comprise: a load sensor in communication with the controller, the load sensor being configured to provide a signal indicative of the weight applied by a load attached to the connection point; wherein the controller is configured to control the load system in response to the signal indicative of the weight applied to the connection point.

The controller may be configured to control the load system in a closed-loop control to balance the force provided by the load system and the weight applied to the connection point. By balancing the weights the flight control system can operate as if the additional weight is not attached.

The unmanned aerial vehicle may have a first mode of operation in which the flight system is operated to take-off and/or land the unmanned aerial vehicle and in which the load system in inactive. By only operating the flight system during take-off and landing the risk of foreign object damage (FOD) is reduced as the load lifting propulsion units which are most likely to affected by FOD are not activated until the unmanned aerial vehicle is further from the ground.

The unmanned aerial vehicle may further have a second mode of operation in which the load system is activated to provide thrust equal to the weight of a load, and in which the flight system is used to generate thrust to manoeuvre the unmanned aerial vehicle and load. The load system thus counters the weight of the load and the flight system can simply be used to fly the unmanned aerial vehicle.

The cargo area may be provided at a centre of the unmanned aerial vehicle. By providing the cargo area at the centre of the unmanned aerial vehicle the load applied by the weight is applied centrally which aids the counterbalancing of this weight with the load system.

The cargo area may comprise a connection point and a tether. The use of a tether allows the slack in the tether to be taken up by the unmanned aerial vehicle as it takes-off and lands and hence the weight of the load is not applied to the unmanned aerial vehicle until it is sufficiently above the ground.

The tether may be releasably attached to the unmanned aerial vehicle and/or to the load. The tether may be remotely releasable, preferably via an electro-magnet. By having the tether releasably attachable to the unmanned aerial vehicle and or to the load, the load can be quickly attached or detached thereto. When the tether is remotely releasably attachable the unmanned aerial vehicle can lift and drop the load in remote situations without human interaction.

A method of operating an unmanned aerial vehicle is provided herein. The unmanned aerial vehicle comprises a flight system for providing thrust to manoeuvre the vehicle; a cargo area for coupling to or receiving a load to the unmanned aerial vehicle; and a load system for providing thrust additional to the thrust provided by the flight system to thereby lift a load attached to the connection. The method comprises the steps of: taking-off the vehicle from the ground using only the flight system; attaching a load to the connection point; and activating the load system to provide additional thrust to lift the load.

This method the flight system to be used for the high precision manoeuvrability required for flight while the load system is used to provide lift for lifting a heavy load. This therefore allows the unmanned aerial vehicle to lift a heavy load while maintaining manoeuvrability during flight. Separating the first and second control systems allows the controller to effectively and efficiently provide additional thrust when necessary to lift the device separate to the flight control system The connection point may comprise a tether; and in the method: the step of attaching a load is carried out before the step of taking-off; and the load is attached to the tether such that the vehicle can fly around the load under slack in the tether before the weight of the load is applied to the connection point. The use of a tether allows the slack in the tether to be taken up by the unmanned aerial vehicle as it takes-off and lands and hence the weight of the load is not applied to the unmanned aerial vehicle until it is sufficiently above the ground.

Use of a load system comprising a first gas turbine propulsion system is provided herein. The use is to provide thrust additional to the thrust provided by a flight system to lift a load attached to an unmanned aerial vehicle, the flight system thrust being used to manoeuvre the unmanned aerial vehicle.

This use the flight system to be used for the high precision manoeuvrability required for flight while the gas turbine propulsion system is used to provide lift for lifting a heavy load. This therefore allows the unmanned aerial vehicle to lift a heavy load while maintaining manoeuvrability during flight.

The present invention will now be described with respect to the following Figures in which:

FIGS. 3A to 3F show the steps of using the unmanned aerial vehicle of FIG. 1.

Figure 1:
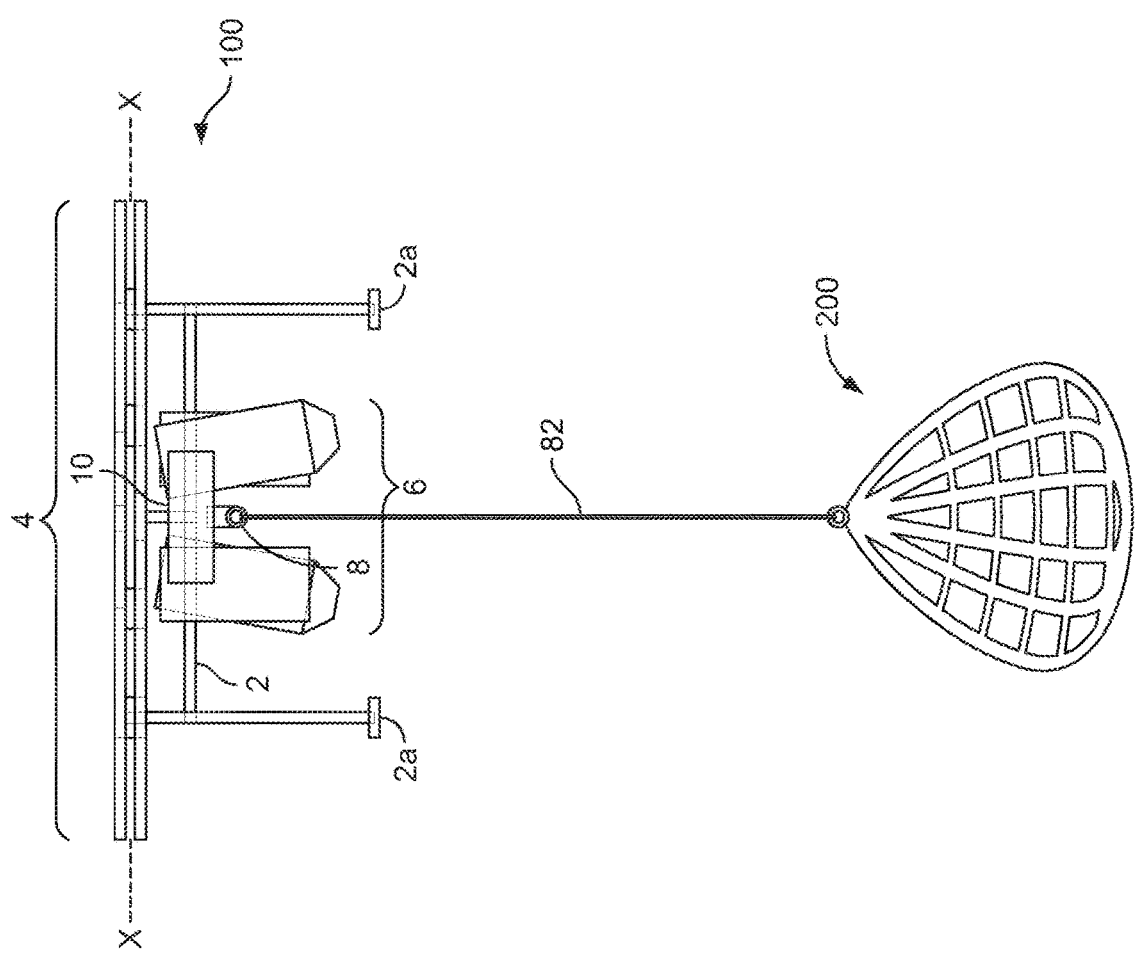
FIG. 1 is a side view of an unmanned aerial vehicle according to the present invention lifting a load.

FIG. 1 shows an unmanned aerial vehicle 100 lifting a load 200. The load 200 depicted in FIG. 1 is contained within a flexible bag, but an unmanned aerial vehicle 100 according to the present invention may be used for any type of load.

The unmanned aerial vehicle 100 comprises a frame 2. The frame 2 may comprise a housing or form a part thereof. The frame 2 depicted in the Figures is generally cross shaped when viewed from above, but any suitable shape may be used. The frame 2 comprises a plurality of feet 2 for supporting the unmanned aerial vehicle 100 on the ground.

The unmanned aerial vehicle 100 further comprises a flight system 4 and a load system 6. Each of the flight system 4 and the load system 6 are coupled to the frame 2. A cargo area is provided on the unmanned aerial vehicle. The cargo area may, for example, be a container such as a cargo bay for receiving a load. The cargo area may be inside the frame/housing 8. Alternatively, or in addition, the cargo area may comprise a connection point 8 to which a load can be coupled. The connection point 8 may be provided on an outer surface of the frame/housing 8. The unmanned aerial vehicle 100 is provided with a connection point 8 provided on the frame 2. The connection point 8 allows a load 200 to be attached to the unmanned aerial vehicle 100.

The flight system 4 provides the thrust required to fly and manoeuvre the unmanned aerial vehicle 100 in an unloaded state. In particular, the flight system 4 comprises one or more rotor assembly 40, preferably three or more. Each rotor assembly 40 comprises a flight rotor 42 and a corresponding electric motor 44. The flight rotor 42 is attached to and driven by the electric motor 44. The electric motor 44 is attached to the frame 2. One or more sources of electrical power (not shown) are provided to drive the electric motors 44 and hence drive the rotors 42 to fly the unmanned aerial vehicle 100. In particular, the sources of electrical power may be batteries, such as lithium-ion batteries.

Figure 2:
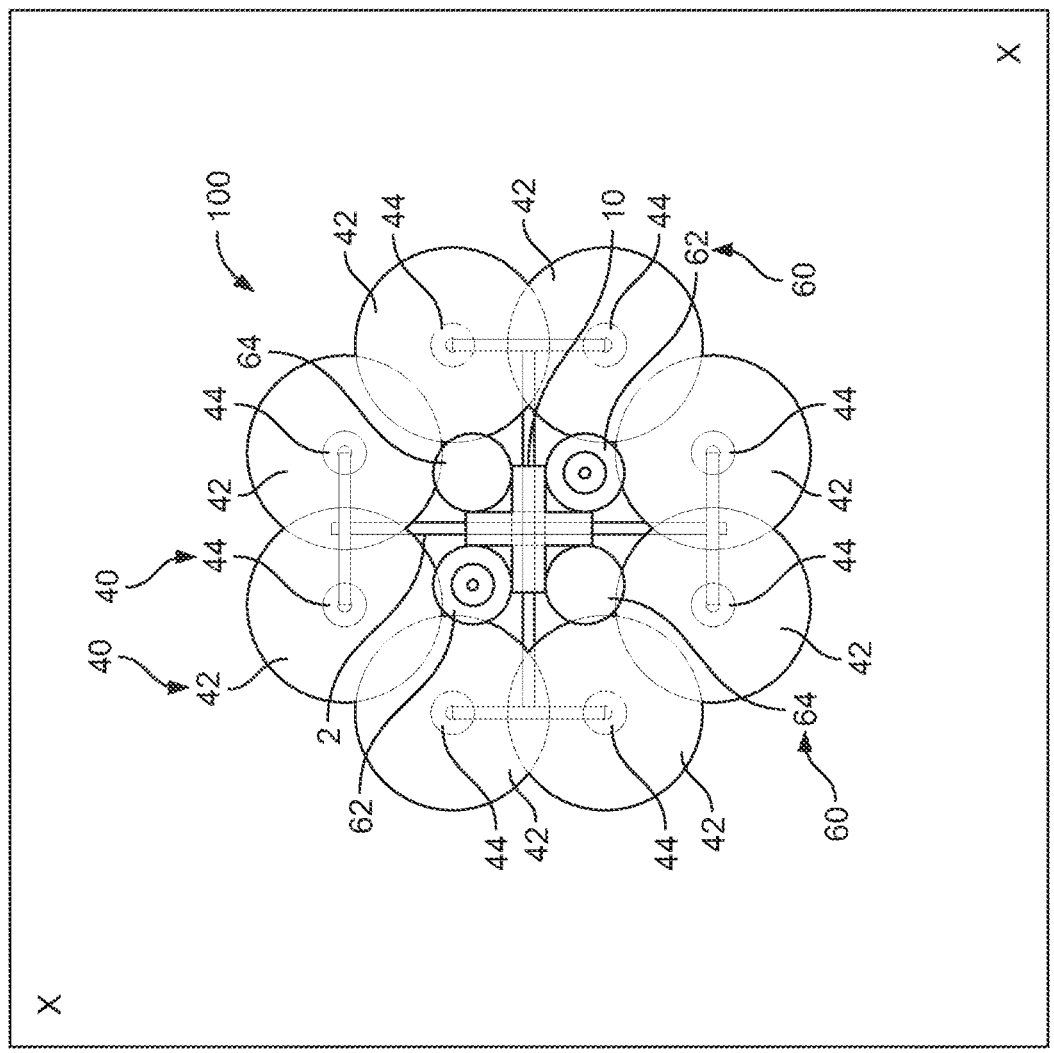
FIG. 2 is a top view of the unmanned aerial vehicle of FIG. 1.

In particular embodiments, an even number of rotor assemblies 40 are provided. Preferably, the unmanned aerial vehicle 100 comprises three, four, six or eight rotor assemblies 40. These rotor assemblies 40 are preferably provided around an outer periphery of the unmanned aerial vehicle 100 as shown in FIG. 2. Preferably, an outer perimeter of the unmanned aerial vehicle 100 is defined by the rotor assemblies 40. The rotor assemblies 40 are preferably provided symmetrically around the unmanned aerial vehicle 100 to provide balanced forces in flight.

The rotor assemblies 40 define a thrust direction 46 in which air is directed to produce thrust for flight. A plane X may be defined passing through each one of the rotor assemblies 40. This plane X is generally perpendicular to the ground plane when the unmanned aerial vehicle is sat on level ground for take-off. The thrust direction 46 of each rotor assembly 40 is generally vertically downwards (e.g. with respect to the unmanned aerial vehicle 100 when the feet are sat on level ground) or generally perpendicular to the plane X. The thrust direction 46 of each rotor assembly may have a deviation of up to and including 20 degrees from the perpendicular to the plane X. Preferably the deviation is between 10 and 20 degrees. While the thrust direction 46 of each rotor assembly 40 may deviate by up to 20 degrees, the net thrust direction of all the rotor assemblies 40 is preferably substantially perpendicular to the plane X.

A controller 10 is provided on the unmanned aerial vehicle 100 for controlling the flight system 4 to fly and manoeuvre the unmanned aerial vehicle 100. While the controller 10 may be a single unit, it also may be a plurality of distributed units each of which contribute to the overall controller 10.

The unmanned aerial vehicle 100 further comprises a load system 6. This load system 6 is used to provide additional thrust in order to lift a load 200. The load system 6 is preferably powered by combustion and so preferably comprises a combustion chamber. The load system 6 preferably comprises one or more gas turbine propulsion systems 62. A gas turbine propulsion system 62 is a system for generating thrust which is driven by expanding hot gasses produced, for example, by burning a fuel.

These gas turbine propulsion systems 62 may comprise a ducted fan which produces the additional thrust by way of exhausting a jet of gas. In particular, the gas turbine propulsion system 62 may be a turbojet, turbofan or turboprop.

When a plurality of gas turbine propulsion systems 62 are provided, these are preferably arranged with an N-fold rotational symmetry in a plane generally perpendicular to the thrust direction 46, where N is the number of gas turbine propulsion systems 62. The plane generally perpendicular to the thrust direction 46 may be the plane X. For example, FIG. 2 shoes two gas turbine propulsion systems 62 and as shown in FIG. 2 these gas turbine propulsion systems 62 are arranged in a 2-fold rotational symmetry.

One or more fuel storage tanks 64 are provided on the unmanned aerial vehicle 100 and are connected to the gas turbine propulsion systems 62. Each fuel storage tank 64 stores combustible fuel (such as avtur (jet fuel)) for powering the gas turbine propulsion systems 62. The fuel has a greater specific energy than the batteries of the flight system 4. Jet fuel for example has a specific energy on the order of 42 MJ/kg. Therefore, the thrust to weight ratio provided by these gas turbine propulsion systems 62 is much greater than the rotor assemblies 40.

Typically, gas turbine propulsion systems 62 cannot provide the fast and agile attitude control needed to fly the unmanned aerial vehicle 100 as the thrusts can only be varied by altering the fuel flow rate. In contrast, the rotor assembly 40, because it is electric, can vary its thrust much quicker by sending a different electrical signal to the electric motor.

Each gas turbine propulsion system 62 may be provided within a radius defined by the rotor assemblies 40. The radius may be defined by the innermost or outermost points of each rotor assembly 40. Preferably, the fuel storage tanks 84 and cargo area are also provided within this radius. The cargo area is most preferably provided in a centre of the unmanned aerial vehicle 100.

Preferably, each gas turbine propulsion system 62 does not overlap with the rotors 42. This ensures that the air displaced by the rotors 42 does not subsequently contact any gas turbine propulsion systems 62.

Figure 3C:
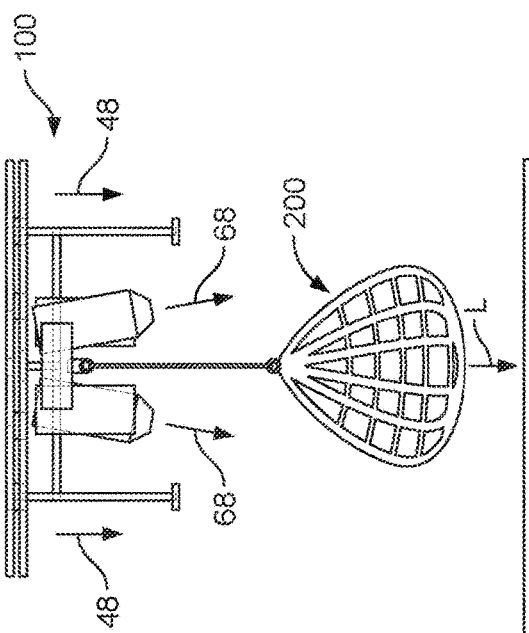

Operation of the unmanned aerial vehicle 100 will now be described with respect to FIGS. 3A to 3F. FIG. 3A shows the unmanned aerial vehicle 100 at a first location with a load 200 to be moved at a spaced-apart second location. The unmanned aerial vehicle 100 carries out a take-off procedure in a first mode of operation as shown in FIG. 3B. In this mode of operation for take-off only the rotor assemblies 40 are actuated in order to generate a thrust 48 to allow the unmanned aerial vehicle 100 to take-off the ground and manoeuvre towards the load 200. The lift thrusts generated by the respective propulsion systems of the unmanned aerial vehicle 100 are depicted by arrows in the direction of the expelled air. Of course, the direction of the force generated on the unmanned aerial vehicle 100 by this expelled air will be opposite to the direction of the arrows.

The unmanned aerial vehicle 100 is generally positioned above the load 200 as depicted in FIG. 3C. The tether 82 is connected to the load 200 via any conventional mechanism. In order to begin lifting the load 200 from the ground the gas turbine propulsion systems 62 are activated by the controller 10 to generate an additional lift 68 for lifting the load 200.

The controller 10 may comprise first and second control systems. The first control system controls the flight system 4 and the second control system controls the load system 6.

Figure 3D:
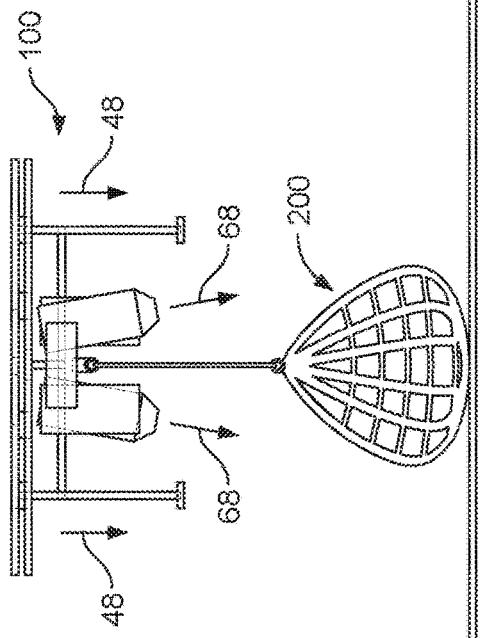

This additional thrust 68 acts to counteract the weight L applied by the load 200 onto the unmanned aerial vehicle 100. With this load L counteracted by the thrust from the turbine propulsion system 62 the rotor assemblies 40 can continue to fly and manoeuvre the vehicle 100 as their contribution is not required to lift the load 200. FIG. 3D shows the unmanned aerial vehicle 100 beginning to lift the load 200 from the ground.

The load 200 can then be transported to a further location as shown in FIG. 3E and detached from the tether 82 via any conventional means. Once the load 200 has been detached from the unmanned aerial vehicle 100 the turbine propulsion system 62 may be deactivated.

The rotor assemblies 40 may fly the unmanned aerial vehicle 100 back to a base position as shown in FIG. 3F.

In this manner, the present invention allows an unmanned aerial vehicle 100 to be used to lift and transport heavy loads while still maintaining the manoeuvrability of a conventional unmanned aerial vehicle.

In particular embodiments, the unmanned aerial vehicle may comprise a load sensor (for example, as part of the connection point 8) in communication with the controller 10. The load sensor is configured to provide a signal indicative of the weight applied by the load 200 attached to the connection point 8. The controller is then configured to control the load system 6 and hence the gas turbine propulsion system 62 in response to the signal indicative of the weight L applied to the connection point 82. In this manner, the controller 10 may be used in a closed-loop control system to balance the weight L applied to connection point 8 with the force provided by the thrust of the gas turbine propulsion systems 62.

In a preferred embodiment, the second control system may vary the throttle of the gas turbine propulsion systems 62 based on the sensed load to balance the load and thrust.

In preferred embodiments the gas turbine propulsion systems 62 may be angled with respect to the thrust direction of the flight rotors 42. This angling of the gas turbine propulsion systems 62 may be symmetrical so as to ensure that each gas turbine propulsion system 62 is arranged to counteract one another and hence not to contribute to movement in the horizontal direction. That is, the net thrust vector is substantially only in the vertical direction, perpendicular to the plane X. This can be used to enhance the stability of the unmanned aerial vehicle 100. Preferably, the gas turbine propulsion systems 62 may each be angled by up to 20 degrees from the perpendicular to the plane X (that is, they may diverge from the vertical direction by up to 20 degrees). Preferably the angle may be between 10 and 20 degrees. This directs the jet plume(s) away from the load 200.

The tether 82 of the present invention allows the unmanned aerial vehicle 100 to fly around the load 200 before the weight L of the load 200 is applied to the connection point 8. In particular, this is useful for instances where the unmanned aerial vehicle 100 may be attached to load 200 prior to take-off or may be detached after landing. In such embodiments the unmanned aerial vehicle 100 is able to take-off and/or land without the weight L of the load 200 being applied to the connection point 8 thanks to a slack in the tether 82. As this weight L is not being applied to the connection point 6 this unmanned aerial vehicle 100 may land and/or take-off using only the rotor assemblies 40 which, as discussed above, are much easier for fine control.

The tether 82 may be releaseably attached to the unmanned aerial vehicle 100 to allow quick collection, lifting and depositing of a load 200. In particular, the tether may be remotely releasable from the unmanned aerial vehicle 100. This may be in the form of any known mechanism but in preferred embodiments may be via an electromagnet which can be selectively magnetised to attach and detach the tether 82.

The invention claimed is:

1. An unmanned aerial vehicle comprising:
   a flight system for producing thrust to maneuver the unmanned aerial vehicle comprising:
      one or more flight rotors defining a plane passing through each flight rotor and a thrust direction generally perpendicular to the plane; and
      one or more electric motor for driving the one or more flight rotors;
   a cargo area for coupling to or receiving a load; and
   a load system for providing thrust additional to the thrust provided by the flight system to thereby lift a load coupled to or received in the cargo area, the load system comprising:
      a plurality of gas turbine propulsion systems fixed with N-fold rotational symmetry in the plane of the flight rotors around a center of the unmanned aerial vehicle, wherein N is the number of gas turbine propulsion systems, wherein the plurality of gas propulsion systems are provided at fixed diverging angles of up to 20 degrees with respect to the thrust direction of the flight rotors to direct a jet plume from each of the plurality of gas propulsion systems away from a load coupled to or received in the cargo area;
      a controller configured to control the flight system and the load system, such that the load system provides a force equivalent to a weight applied by a load attached to a connection point; and
      a load sensor in communication with the controller, the load sensor being configured to provide a signal indicative of the weight applied by the load attached to the connection point and coupled to or received in the cargo area, wherein the controller is configured to control the load system in response to the signal indicative of the weight applied by the load to the connection point.

2. The unmanned aerial vehicle of claim 1, wherein each gas turbine propulsion system comprises a ducted fan for producing the additional thrust in the form of its exhaust gas jet.

3. The unmanned aerial vehicle of claim 1, wherein the gas turbine propulsion system comprises a turbojet; turbofan; or turboprop.

4. The unmanned aerial vehicle of claim 1, wherein the flight system comprises two or more rotors, arranged at an outer periphery of the unmanned aerial vehicle, preferably the flight system comprises four or eight rotors.

5. The unmanned aerial vehicle of claim 4, wherein each gas turbine propulsion system is provided within a radius defined by the rotors.

6. The unmanned aerial vehicle of claim 1, wherein the controller is configured to control the load system in a closed-loop control to balance the force provided by the load system and the weight applied to the connection point.

7. The unmanned aerial vehicle of claim 1, wherein the vehicle has a first mode of operation in which the flight system is operated to take-off and/or land the unmanned aerial vehicle and in which the load system is inactive.

8. An unmanned aerial vehicle comprising:
   a flight system for producing thrust to maneuver the unmanned aerial vehicle comprising:
      one or more flight rotors defining a plane passing through each flight rotor and a thrust direction generally perpendicular to the plane; and
      one or more electric motors for driving the one or more flight rotors;
   a cargo area for coupling to or receiving a load; and
   a load system for providing thrust additional to the thrust provided by the flight system to thereby lift a load coupled to or received in the cargo area, the load system comprising:
      a plurality of gas turbine propulsion systems, wherein each gas propulsion system is provided at a fixed diverging angle of up to 20 degrees with respect to the thrust direction of the flight rotors to direct a jet plume from the gas propulsion system away from a load coupled to or received in the cargo area; and
   a controller configured to control the flight system and load system, such that the load system provides a force equivalent to a weight applied by a load attached to a connection point; and
   a load sensor in communication with the controller, the load sensor being configured to provide a signal indicative of the weight applied by the load attached to the connection point and coupled to or received in the cargo area,
      wherein the controller is configured to control the load system in response to the signal indicative of the weight applied by the load to the connection point.

* * * * *